United States Patent [19]

Phenicie et al.

[11] 4,096,081

[45] Jun. 20, 1978

[54] DETERGENT COMPOSITIONS CONTAINING ALUMINOSILICATE AGGLOMERATES

[75] Inventors: Ronald Eugene Phenicie, Fairfield; Rodney Mahlon Wise, Cincinnati, both of Ohio

[73] Assignee: The Procter & Gamble Company, Cincinnati, Ohio

[21] Appl. No.: 655,800

[22] Filed: Feb. 6, 1976

[51] Int. Cl.$^2$ .......................... C02B 1/44; C11D 3/12; C11D 11/00; C11D 17/06
[52] U.S. Cl. ............................... 252/89 R; 23/313 R; 252/131; 252/135; 252/140; 252/174; 252/179; 252/531; 252/539
[58] Field of Search ................. 252/89, 131, 135, 140, 252/133, 539, 179, 455.2, 531, 174; 23/313

[56] References Cited

U.S. PATENT DOCUMENTS

| | | | |
|---|---|---|---|
| 2,329,694 | 9/1943 | Bodman | 252/368 |
| 2,806,001 | 9/1957 | Fong | 252/550 |
| 3,112,176 | 11/1963 | Haden | 423/329 |
| 3,519,570 | 7/1970 | McCarty | 252/135 |
| 3,664,961 | 5/1972 | Norris | 252/99 |
| 3,852,211 | 12/1974 | Ohren | 252/110 |

FOREIGN PATENT DOCUMENTS 2,433,485  11/1974  Germany .......................... 252/131

*Primary Examiner*—Dennis L. Albrecht
*Attorney, Agent, or Firm*—Robert B. Aylor; Richard C. Witte; Thomas H. O'Flaherty

[57] ABSTRACT

A composition is described herein which contains aluminosilicate materials characterized in their ability to exchange sodium ions for calcium and magnesium ions. The composition also contains, in an intimate mixture with the aluminosilicate, an inorganic salt and a water-soluble or water-dispersable organic agglomerating compound having a melting point between 30° C and 100° C. The particulate composition described above is suitable for water softening per se or for admixture into detergent compositions.

18 Claims, No Drawings

DETERGENT COMPOSITIONS CONTAINING ALUMINOSILICATE AGGLOMERATES

BACKGROUND OF THE INVENTION

1. Field of the Invention.

The present invention relates to compositions of matter which are useful for water softening.

2. Description of the Art.

Aluminosilicates which have high calcium and magnesium exchange rates and capacity have been added to water softening and detergent products to remove water hardness. Effective removal of calcium and magnesium ions from water when considered in the context of detergent products is important in that those ions can precipitate anionic surfactants rendering the former less effective in fabric cleaning. Moreover if the calcium and magnesium ions are not removed from water used for washing, these ions will interact with soils on the fabrics thus interferring with soil removal.

Water softening and detergent products utilizing the aluminosilicates which form a part of the present invention, are described in several references. For instance, Corkill et al in U.S. Patent Application Ser. No. 450,266, filed Mar. 11, 1974, describes the use of such aluminosilicates which are added to detergent compositions by admixing the aluminosilicate with the remaining components, or by spray drying the aluminosilicate with the remaining components of the composition.

U.S. Ser. No. 479,951, filed June 17, 1974, Krummel et al, describes the formulation of a detergent composition containing aluminosilicates and alkali metal silicates. In Krummel et al the silicates are present at a very low level to avoid the interaction with the aluminosilicate. This product is formed by spray drying all of the components in the composition including the aluminosilicate and the alkali metal silicate.

In the application of Ohren et al, U.S. Ser. No. 598,292, filed July 23, 1975, a detergent composition is described which is prepared by spray drying the aluminosilicates of the present invention, high levels of alkali metal silicates, and alkali metal ortho or pyrophosphates. The problem of interaction of the aluminosilicate and the alkali metal silicate is minimized by carefully controlling the moisture content of the product during the spray drying operation. This moisture control has the additional benefit of allowing the alkali metal orthophosphate or pyrophosphate to function as a precipitating builder.

A further description of aluminosilicates which have utility in the present invention for water softening is found in U.S. Patent Application Ser. No. 379,881, filed July 16, 1973 in the name of Madison et al. Further descriptions of aluminosilicate materials having utility for water softening in detergent compositions are found in Belgian Patents Nos. 813,581 and 828,753, South African Patent Application No. 74/2862, South African Patent Application No. 74/3319, and Netherlands Patent Application No. 74/03383.

Materials which are suitable as organic agglomerating compounds have been described in United States Patent Application Ser. No. 631,026, filed Nov. 11, 1975 by Ashcraft and in U.S. Pat. No. 2,806,001, issued on Sept. 10, 1957.

It has been found that the incorporation of the aluminosilicate materials into detergent and water softening compositions described above presents great difficulties. For instance, if aluminosilicates are to be admixed into the composition as a dry material, a considerable quantity of dust can be generated by improper handling of the finely divided aluminosilicate. Moreover, the aluminosilicates per se are not free-flowing. It is also noted that if the aluminosilicate materials with which the present invention is concerned are admixed dry with the remainder of a composition, that segregation of the fine aluminosilicate materials will occur during packing and transportation of the finished product. The segregation is extremely undesirable in that when the consumer uses the product the lack of uniformity may result in over-usage or underusage. Moreover, consumers are accustomed to using detergent products of uniform quality and appearance such as the phosphate built products currently marketed. Thus it is desirable that aluminosilicate products designed for laundry or water softening purposes should be as compatible as possible in both appearance and performance with currently marketed phosphate products. While the present invention may contain phosphate salts at a low level the reduction of these materials is desirable because of the suspected ability of the phosphates to eutrophy lakes and rivers.

The proposed alternatives to admixing the fine aluminosilicate materials into water softening and detergent compositions includes premixing the aluminosilicate with the remaining detergent components such as alkali metal silicates, and other detergent components and then spray drying the slurry to form uniformly sized granules containing essentially all of the components in the composition.

Compositions in which the aluminosilicates have been prepared by spray drying a slurry containing surfactants and alkali metal silicates have proved to be extremely difficult to manufacture with requisite uniformity. For instance, it has been observed that when the aluminosilicates are exposed to alkali metal silicates in an aqueous slurry that a chemical reaction takes place, leading to cross-polymerization of the aluminosilicate molecules through bridging by the alkali metal silicate. While elimination of the alkali metal silicate from the detergent composition would seem to be a desirable solution it is not practical. The alkali metal silicates are highly favored components in detergent compositions because of their ability to protect washing machine surfaces from corrosion and also aid in forming crisp, free-flowing granules.

Another possible alternative which could be utilized to prevent the interaction of the aluminosilicate and the alkali metal silicate would be to admix the alkali metal silicate into the final composition. Aiside from the fact that the alkali metal silicate is needed in the granule containing the organic detergent components to provide desirable granule characteristics, there is no practical manner for admixing alkali metal silicates into the final composition. This decision is predicated upon the fact that the alkali metal silicates when purchased in a dry form are highly voluminous, thus requiring large storage facilities and plant capability for admixing large quantities of the silicate. It is also noted that dry alkali metal silicates as well as being of very low density, are relatively expensive when compared to the price of alkali metal silicate solutions which are commercially available.

In the copending application of Ohren, Serial Number 655,801 filed Feb. 6, 1976, herein incorporated by reference, similar particulate compositions are disclosed. These compositions while performing eminently well for water softening have a tendency to be friable.

Friability, defined as the inability of a composition to maintain its integrity without crumbling is an undesirable property. The friability of the aforementioned particulate can be overcome to a certain extent by increasing the amount of the agglomerating compound utilized in relation to the aluminosilicate. This remedy is, however, undesirable in that it is not a complete cure of the friability of the particulate and the agglomerating compound is relatively expensive. Thus it remains to prepare a particulate in accordance with the objectives of the Ohren application in mind with substantially reduced friability.

It is therefore an object of the present invention to prepare a free-flowing, water softening or detergent composition containing an aluminosilicate, an inorganic salt, and an organic agglomerating compound in particulate form.

It is a further object of the present invention to prepare an aluminosilicate-containing product for water softening or detergent compositions which provides a substantially non-friable product.

It is a further object of the present invention to prepare an aluminosilicate-containing composition in which the aluminosilicate does not segregate from the remaining components during transportation and storage.

It has been found that the organic agglomerating compound, the inorganic salt, and the aluminosilicates when prepared according to the invention, form free-flowing consumer acceptable particulate compositions which are substantially non-friable. Surprisingly, very low levels of the inorganic salts substantially reduce friability.

It has also been found that the particulate when admixed into detergent compositions cleans better than products in which the aluminosilicate and alkali metal silicate have been spray-dried together.

These and other advantages to be obtained by the present invention are described hereinafter.

Throughout the specification and claims, percentages and ratios are by weight and temperatures are in degrees centigrade unless otherwise indicated.

SUMMARY OF THE INVENTION

A free-flowing particulate water-softening composition comprising an intimate mixture of:
(a) from about 5 parts to about 50 parts of an aluminosilicate silicate selected from the group consisting of:
  (i) an amorphous compound of the formula $Na_x(xAlO_2.ySiO_2)$ wherein $x$ has a value of from 1 to 1.2 and $y$ is 1, said amorphous material being further characterized by an $Mg^{++}$ exchange capacity of at least about 50 mg eq. $CaCO_3$/g (one milliequivalent/g.) and,
  (ii) a compound of the formula $Na_z[(AlO_2)_z.(SiO_2)_j]kH_2O$ wherein $z$ and $j$ are integers of at least 6; the molar ratio of $z$ to $j$ is in the range of from 1.0 to about 0.5 and $k$ is an integer from about 15 to 264; said aluminosilicate ion exchange material having a particle size diameter from about 0.1 micron to about 100 microns; a calcium ion exchange capacity of at least about 200 mg eq./g (four milliequivalents/g.); and a calcium ion exchange rate of at least about 2 grains/gallon/minute gram and mixtures thereof;
(b) from about 0.3 parts to about 3 parts of an organic agglomerating compound having a melting point of from 30° C to 100° C; and,
(c) from about 0.5 to about 3 parts of an inorganic salt.

DETAILED DESCRIPTION OF THE INVENTION

The aluminosilicate compounds of the formula described in (a) (i) in the Summary are prepared as described below.

The amorphous and mixed amorphous-crystalline aluminosilicate ion exchange builders herein are prepared by a process which results in the formation of materials which are particularly suitable for use as detergency builders and water softeners. Specifically, the aluminosilicates herein have a higher calcium ion exchange capacity and a higher exchange rate than similar materials heretofore suggested as detergency builders. Moreover, the aluminosilicates herein sequester magnesium cations sufficiently to be useful as builders for detergency use.

The desirable ion exchange properties of the aluminosilicates herein appear to be a function of several inter-related factors which result from their method of preparation. The amorphous aluminosilicates exhibit both $Ca^{++}$ and $Mg^{++}$ control; the mixed amorphous-crystalline aluminosilicates also exhibit both $Ca^{++}$ and $Mg^{++}$ control; but the pure crystalline aluminosilicate exhibits only $Ca^{++}$ control. Accordingly, to provide mixed hardness control, the ion exchange materials herein are provided as the substantially pure amorphous aluminosilicate, and as mixtures comprising a substantial proportion of the amorphous aluminosilicate, as disclosed hereinabove, in combination with the crystalline aluminosilicate.

From the foregoing it is seen that the amorphous aluminosilicate material provided by this invention is highly preferred as an ion exchange builder by virtue of its mixed hardness control properties. However, the pure amorphous material is difficult to prepare on an industrial scale. The mixed amorphous-crystalline aluminosilicate is more readily obtained and, when prepared in the appropriate amorphous:crystalline ratios disclosed herein, provides excellent mixed hardness control.

One essential feature of both the amorphous and the mixed amorphous-crystalline ion exchange builder materials herein is that they be in the "sodium form". For example, it has surprisingly been found that the potassium and hydrogen forms of the instant aluminosilicates exhibit neither the exchange rate nor the exchange capacity necessary for optimal builder use.

A second essential feature of the ion exchange builder materials herein is that they be in a hydrated form, i.e., contain about 10% to about 22% by weight of water. Highly preferred aluminosilicates herein contain the theoretical maximum of from about 18% to about 22% (wt.) water in their crystal matrix. It has been found, for example, that less highly hydrated aluminosilicates, e.g., those with about 6% water, do not function effectively as ion exchange builders when employed in the context of a laundry detergent composition.

Moreover, the amorphous aluminosilicates herein are stable under processing conditions commonly employed in the preparation of spray-dried detergent compositions. That is to say, the amorphous aluminosilicates herein retain their mixed hardness control properties even after heating to 50° C–100° C. This is unusual, inasmuch as other amorphous aluminosilicates lose their ion exchange properties upon heating.

A third essential feature of the ion exchange builder materials herein is their particle size range. Of course, the amorphous aluminosilicates herein inherently have a small particle size (ca. 0.01 micron—5 micron diameter). The crystalline fraction of the mixed amorphous-crystalline materials desirably has a small particle size in the range disclosed herein. Proper selection in small particle sizes results in fast, highly efficient builder materials. Moreover, the small particle size of the aluminosilicates herein presumably accounts for the fact that they are not noticeably deposited on fabrics from an aqueous laundering liquor. This non-deposition is, of course, desirable when the aluminosilicates are employed as detergent builders.

The method set forth below for preparing the aluminosilicates herein is specifically designed to prepare such materials in the amorphous state. In particular, the process herein employs highly concentrated solutions which tend to favor rapid formation of amorphous particles. The concentrations of the solutions herein are limited only by the need to pour and efficiently mix the reactants.

Moreover, the process herein takes into consideration all the essential elements disclosed above for preparing an effective aluminosilicate builder material. First, the process avoids contamination of the aluminosilicate product by cations other than sodium. Second, the process is designed to form the aluminosilicate in its most highly hydrated form. Hence, high temperature heating and drying are avoided. Third, the process is designed to form the aluminosilicate materials in a finely-divided state having a narrow range of small particle sizes. Of course, additional grinding operations can be employed to still further reduce the particle size. However, the need for such mechanical reduction steps is substantially lessened by following the process herein.

The chemical reactions involved in the preparation of the aluminosilicates of this invention are complex, due to the multiple reactions which can occur upon admixture of aluminate and silicate in an aqueous, basic medium. Under the reaction conditions employed herein, the reactants appear to first form an amorphous aluminosilicate material, which undergoes further transformation before being converted into a crystalline aluminosilicate. The amorphous-crystalline conversion is thus not step-wise, but occurs throughout the process, inasmuch as the system of reactants is in a dynamic state. While, in theory, it should be possible to admix the reactants, quench the reaction at the appropriate point, and secure only the desired amorphous aluminosilicate, this is not feasible in large-scale preparations. In practice, the process herein is designed to prepare mixtures of the amorphous and crystalline aluminosilicates and to stop the reaction at a point where a substantial portion (ca. 50%, and greater) of the amorphous materials have not yet been converted to the crystalline form. The use of highly concentrated mixtures of reactants and careful control of reaction times, all in the manner hereinafter disclosed, achieves these desirable results. Following preparation of the mixed amorphous-crystalline materials herein, the mixtures can be separated by suspension in water, whereby the crystalline material settles and the amorphous material remains suspended.

The aluminosilicate ion exchange builder-softening materials herein are prepared according to the following procedure:

(a) Admix sodium aluminate ($NaAlO_2$) and sodium hydroxide in water to form a mixture having the following (preferred) weight ratios of the components:

$H_2O/NaAlO_2 = 2.9:1$ $H_2O/NaOH = 5.2:1$ $NaAlO_2/NaOH = 1.8:1$.

The temperature of the mixture is adjusted to about 20° C – 70° C, preferably about 50° C. If prepared at lower temperatures, the mixture of aluminate and sodium hydroxide is not a true solution and may contain a small quantity of finely dispersed particulate materials.

(b) Add a sodium silicate solution (ca. 37% wt. solid; 3.2:1 $SiO_2/Na_2O$ ratio) rapidly to the mixture of step (a). This rapid mixing step can be carried out using a vessel employed with an efficient agitator; alternatively, the two mixtures at the desired temperature can be metered into an inline mixer which can be part of a dominant bath system to provide a continuous process. The ratio of $NaAlO_2$ to sodium silicate (anhydrous basis) is about 1.6:1.

(c) Heat the mixture of step (b) rapidly to 75° C to 95° C (preferably 80° C – 85° C) and maintain at this temperature for 10 minutes to 60 minutes (preferably 10 minutes – 20 minutes).

(d) Cool the slurry from step (c) to about 50° C and filter. Recover the resulting filter cake and wash in water using a sufficient quantity of water to yield a wash water/solids (anhydrous basis) weight ratio of about 2.0:1 (preferred). Repeat the filtration and washing operations.

The filter cake prepared by the foregoing process comprises a mixture of crystalline aluminosilicate and amorphous aluminosilicate in approximately a 1:1 (wt.) ratio. The material from the filter cake exhibits a rapid and efficient uptake of both $Ca^{++}$ and $Mg^{++}$ ions. The filter cake is useful per se as an ion exchange material. For use in powdered or granular detergent compositions, it is preferred to dry the filter cake to a moisture content of from about 10% to about 22% by weight using a drying temperature below about 175° C to avoid excessive dehydration. Preferably, the drying is performed at 100° C to 105° C.

The amorphous aluminosilicate of this invention can, if desired, be separated from the amorphous-crystalline mixture prepared in the foregoing manner by simply suspending the filter cake mixture in water. When thus suspended, the crystalline portion of the mix settles out (over a period of about 1-6 hours), whereas the amorphous material remains suspended in the aqueous medium. The amorphous material can be separated by decantation or other physical means. Of course, low speed centrifugation can be employed to more rapidly separate the amorphous component from the crystalline component of the mixtures herein.

Aluminosilicates prepared in the foregoing manner are mixtures of the amorphous and crystalline materials. The crystalline portion of the aluminosilicate is characterized by a cubic crystal structure. Of course, the amorphous material has an irregular structure which is not amenable to analysis by x-ray diffraction.

Both the crystalline and amorphous aluminosilicate ion exchangers herein are further characterized by their calcium ion exchange capacity which is at least about 200 mg. equivalent of $CaCO_3$ hardness/gram of aluminosilicate, calculated on an anhydrous basis, and which generally lies within the range of about 300 mg. eq./g. to about 352 mg. eq./g.

The ion exchange materials herein are further characterized by their calcium ion exchange rate which is at least about 2 grains ($Ca^{++}$)/gal./min./g. of aluminosilicate (anhydrous basis), and lies within the range of about 2 gr./gal./min./g. to about 6 gr./gal./min./g., based on calcium ion hardness. Optimum aluminosilicates for builder purposes exhibit a $Ca^{++}$ exchange rate of at least about 4 gr./gal./min./g.

The aluminosilicate ion exchangers herein are further characterized by their magnesium exchange capacity, which is at least about 50 mg. eq. of $CaCO_3$ hardness/gram of aluminosilicate, calculated on an anhydrous basis, and which generally lies within the range of about 50 mg. eq./g. to 150 mg. eq./g. or greater.

The ion exchange materials herein are still further characterized by their magnesium ion exchange rate which is at least about 1 grain ($Mg^{++}$)/gal./min./g. of aluminosilicate (anhydrous basis), and lies within the range of 1 gr./gal./min./g. to about 3 gr./gal./min./g., based on magnesium ion hardness. Optimum aluminosilicates for builder purposes exhibit a magnesium exchange rate of at least about 2 gr./gal./min./g.

The ion exchange properties of the aluminosilicates herein can conveniently be determined by means of a calcium ion electrode and a divalent ion electrode. In this technique the rate and capacity of $Ca^{++}$ and $Mg^{++}$ uptake from an aqueous solution containing a known quantity of $Ca^{++}$ and $Mg^{++}$ ions are determined as a function of the amount of aluminosilicate ion exchange material added to the solution. More specifically, the on exchange rates of the amorphous and mixed amorphous-crystalline aluminosilicates herein are determined as follows. The aluminosilicate prepared in the foregoing manner is added in the sodium form to 150 ml. of aqueous solution containing 4.7 gr./gal. $Ca^{++}$ and 2.4 gr./gal. $Mg^{++}$ (measured as $CaCO_3$) at a concentration of 0.06% (wt.), pH of 10.0, and with gentle stirring of the solution. The rate of calcium depletion is measured using the calcium electrode (commercially available; Orion) and the rate of total calcium and magnesium depletion is determined using the general divalent cation electrode. Magnesium ion removal is thereafter determined by the difference in readings. The rate of depletion is determined for each cation by taking measurements at appropriate time intervals. Total depletion from the solution is calculated after ten minutes, which corresponds to the normal wash time in an aqueous laundering process. Rate curves for calcium depletion, magnesium depletion and mixed calcium and magnesium depletion can be plotted as gr./gal. v. time.

Calcium exchange capacity of the aluminosilicates herein can be determined by a simple titration method. In practice the aluminosilicate sample is equilibrated with a known excess of $Ca^{++}$. After equilibration and uptake of the calcium ion, the excess calcium ion remaining in solution is determined by a standard titration with EDTA, using a standard Eriochrome Black T Indicator. Magnesium ion capacity is determined titrimetrically, in similar fashion.

As noted hereinabove, both the crystalline and amorphous components of the aluminosilicates herein exhibit excellent rates of exchange and capacities for calcium ions. Moreover, the amorphous material herein additionally provides rapid and efficient uptake of magnesium ions. Accordingly, the mixture of crystalline and amorphous material provides mixed $Ca^{++}/Mg^{++}$ hardness control.

The following example is a typical pilot plant scale preparation of the mixed amorphous-crystalline aluminosilicate ion exchange builder herein. As noted hereinabove, the amorphous aluminosilicate can be readily removed from the crystalline aluminosilicate by suspending the filter cake in water. The crystalline portion of the mixture settles out (ca. 1 to 6 hours' standing) and the amorphous portion remains suspended in the water. The portions can be separated by decanting or other mechanical means.

EXAMPLE I

A typical charge used in the pilot plant was as follows:

| | As Is | Wt.% (Anhyd.) |
|---|---|---|
| Water | 212.8 lb. | 64.29 |
| Sodium Aluminate | 115.4 lb. | 16.40 |
| Sodium Hydroxide (50% aqueous) | 109.9 lb. | 9.05 |
| Sodium Silicate (3.2:1 $SiO_2:Na_2O$ ratio; ca. 50% wt. aqueous solution) | 165.0 lb. | 10.26 |

The pilot plant consisted of a baffled 55 gallon insulated reaction vessel having a Lightnin' propeller-type mixer and a side arm heat exchanger equipped for recirculation and fed by a gear pump. The pump had a rated capacity of 5 gallons per minute. The discharge stream from the reactor passed through another heat exchanger which cooled the stream which was then fed to a vacuum rotary filter. Cake from the filter fell into a tank equipped with a Lightnin' propeller-type mixer where the cake was reslurried with wash water. The slurry was then fed to a vacuum rotary filter and the cake recovered or rewashed, as desired. Auxiliary equipment included a metering pump used to feed the silicate raw material solution at a desired rate.

The water was charged to the reaction vessel followed by the sodium aluminate and the sodium hydroxide. The mixture was agitated until the aluminate was "dissolved". The temperature was adjusted to 50° C. The sodium silicate at 50° C was then metered into the aluminate-lye solution at a rate of about 35 lb./min. Maximum agitation was required at this stage of the operation to prevent solidification of the slurry. The slurry was agitated for a period of about 15 minutes to break up lumps and to assure complete contact between reactants. The slurry was then passed through the side arm heat exchanger and the temperature was raised to about 80° C – 100° C, and maintained at this range for about 1 hour. The slurry was then passed through a heat exchanger, cooled to about 37° C and filtered. The cake was water-washed several times.

The aluminosilicate prepared in the foregoing manner consisted of about 50:50 (wt.) of a crystalline hydrated aluminosilicate of the formula $$Na_{12}(SiO_2.AlO_2)_{12}.27H_2O$$

having a particle diameter in the range of 1 to 20 microns, a $Ca^{++}$ exchange rate of about 5 gr./gal./min./g. and a $Ca^{++}$ exchange capacity of about 300 mg eq./g., and an amorphous aluminosilicate of the general formula $Na_x(xAlO_2 \cdot ySiO_2)$, ($x$ and $y$ as above). Said amorphous aluminosilicate is further characterized by a magnesium ion exchange capacity of about 125 mg eq. $CaCO_3$/gram of aluminosilicate.

The amorphous aluminosilicate was separated from the crystalline aluminosilicate by suspension of the mixed filter cake material in water for a period of about 6 hours, followed by withdrawal of the supernatant fluid containing the amorphous material and drying.

The preparation of the second of the aluminosilicate compounds useful in the present invention and shown generically in (a) (ii) of the Summary is described below.

The aluminosilicate ion exchange materials herein are prepared by a process which results in the formation of materials which are particularly suitable for use as detergency builders and water softeners. Specifically, the aluminosilicates herein have both a higher calcium ion exchange capacity and a higher exchange rate than similar materials heretofore suggested as detergency builders. Such high calcium ion exchange rate and capacity appear to be a function of several interrelated factors which result from the method of preparing said aluminosilicate ion exchange materials.

One essential feature of the ion exchange builder materials herein is that they be in the "sodium form". That is to say, it has surprisingly been found, for example, that the potassium and hydrogen forms of the instant aluminosilicate exhibit neither the exchange rate nor the exchange capacity necessary for optimal builder use.

A second essential feature of the ion exchange builder materials herein is that they be in a hydrated form, i.e. contain 10%–28%, preferably 10%–22%, by weight of water. Highly preferred aluminosilicates herein contain from about 18% to about 22% (wt.) water in their crystal matrix. It has been found, for example, that less highly hydrated aluminosilicates, e.g. those with about 6% water, do not function effectively as ion exchange builders when employed in the context of a laundry detergent composition.

A third essential feature of the ion exchange builder materials herein is their particle size range. Proper selection of small particle sizes results in fast, highly efficient builder materials.

The method set forth below for preparing the aluminosilicates herein takes into consideration all of the foregoing essential elements. First, the method avoids contamination of the aluminosilicate product by cations other than sodium. For example, product washing steps involving acids or bases other than sodium hydroxide are avoided. Second, the process is designed to form the aluminosilicate in its most highly hydrated form. Hence, high temperature heating and drying are avoided. Third, the process is designed to form the aluminosilicate materials in a finely-divided state having a narrow range of small particle sizes. Of course, additional grinding operations can be employed to still further reduce the particle size. However, the need for such mechanical reduction steps is substantially lessened by the process herein.

The aluminosilicates herein are prepared according to the following procedure:

(a) dissolve sodium aluminate (Na $AlO_2$) in water to form a homogeneous solution having a concentration of Na $AlO_2$ of about 16.5% by weight (preferred);

(b) add sodium hydroxide to the sodium aluminate solution of step (a) at a weight ratio of NaOH:Na $AlO_2$ of 1:1.8 (preferred) and maintain the temperature of the solution at about 50° C until all the NaOH dissolves and a homogeneous solution forms;

(c) add sodium silicate ($Na_2 SiO_3$ having a $SiO_2:Na_2O$ weight ratio of 3.2 to 1) to the solution of step (b) to provide a solution having a weight ratio of $Na_2SiO_3$:NaOH of 1.14:1 and a weight ratio of $Na_2SiO_3$:NaAlO_2$ of 0.63:1;

(d) heat the mixture prepared in step (c) to about 90° C – 100° C and maintain at this temperature range for about one hour.

In a preferred embodiment, the mixture of step (c) is cooled to a temperature below about 25° C, preferably in the range from 17° C to 23° C, and maintained at that temperature for a period from about 25 hours to about 500 hours, preferably from about 75 hours to about 200 hours.

The mixture resulting from step (d) is cooled to a temperature of about 50° C and thereafter filtered to collect the desired aluminosilicate solids. If the low temperature (<25° C) crystallization technique is used, then the precipitate is filtered without additional preparatory steps. The filter cake can optionally be washed free of excess base (deionized water wash preferred to avoid cation contamination). The filter cake is dried to a moisture content of 18% – 22% by weight using a temperature below about 150° C to avoid excessive dehydration. Preferably, the drying is performed at 100° C – 105° C.

Following is a typical pilot-plant scale preparation of the aluminosilicates herein.

| PREPARATION OF ALUMINOSILICATE BUILDER | | | | |
|---|---|---|---|---|
| Component | Pounds (As Is) | Pounds (Anhydrous) | Water | Wt.% Of Total |
| $NaAlO_2$ | 57.72 | 49.454 | 8.27 | 16.40 (Anh.) |
| Sodium Silicate (3.2:1 $SiO_2:Na_2O$) | 82.52 | 30.945 | 51.57 | 10.26 (Anh.) |
| NaOH | 54.96 | 27.304 | 27.66 | 9.05 (Anh.) |
| $H_2O$ (deionized) | 106.40 | | 106.40 | 64.29 |

The sodium aluminate was dissolved in the water with stirring and the sodium hydroxide added thereto. The temperature of the mixture was maintained at 50° C and the sodium silicate was added thereto with stirring. The temperature of the mixture was raised to 90° C – 100° C and maintained within this range for 1 hour with stirring to allow formation of $Na_{12}(AlO_2 \cdot SiO_2)_{12} \cdot 27 H_2O$. The mixture was cooled to 50° C, filtered, and the filter cake washed twice with 100 lbs. of deionized water. The cake was dried at a temperature of 100° C – 105° C to a moisture content of 18% – 22% by weight to provide the aluminosilicate builder material.

The aluminosilicates prepared in the foregoing manner are characterized by a cubic crystal structure.

Water-insoluble aluminosilicates having a molar ratio of $(AlO_2):(SiO_2)$ smaller than 1, i.e. in between 1.0 and about 0.5, can be prepared in a similar manner. These aluminosilicate ion exchange materials ($AlO_2:SiO_2<1$) are also capable of effectively reducing the free polyvalent hardness metal ion content of an aqueous washing liquor in a manner substantially similar to the aluminosilicate ion exchange material having a molar ratio of $AlO_2:SiO_2 = 1$ as described hereinbefore. Examples of aluminosilicates having a molar ratio: $AlO_2:SiO_2 < 1$, suitable for use in the instant compositions include:

$Na_{86}[(AlO_2)_{86}(SiO_2)_{106}] \cdot 264\ H_2O$; and $Na_6[(AlO_2)_6(SiO_2)_{10}] \cdot 15\ H_2O$.

Although completely hydrated aluminosilicate ion exchange materials are preferred herein, it is recognized that the partially dehydrated aluminosilicates having the general formula given hereinbefore are also excellently suitable for rapidly and effectively reducing the water hardness during the laundering operation. Of course, in the process of preparing the instant aluminosilicate ion exchange material, reaction-crystallization parameter fluctuations can result in such partially hydrated materials. As pointed out previously, aluminosilicates having about 6% or less water do not function effectively for the intended purpose in laundering context. The suitability of particular partially dehydrated water-insoluble aluminosilicates for use in the compositions of this invention can easily be asserted and does only involve routine testing as, for example, described herein (Ca-ion exchange capacity; rate of exchange).

The ion exchange properties of the aluminosilicates herein can conveniently be determined by means of a calcium ion electrode. In this technique, the rate and capacity of $Ca^{++}$ uptake from an aqueous solution containing a known quantity of $Ca^{++}$ ion is determined as a function of the amount of aluminosilicate ion exchange material added to the solution.

The water-insoluble, inorganic aluminosilicate ion exchange materials prepared in the foregoing manner are characterized by a particle size diameter from about .1 micron to about 100 microns. Preferred ion exchange materials have a particle size diameter from about 1 micron to about 10 microns. Additional preferred water-insoluble aluminosilicates herein are characterized by a particle size diameter from about 0.2 microns to about 0.7 microns. The term "particle size diameter" herein represents the average particle size diameter of a given ion exchange material as determined by conventional analytical techniques such as, for example, microscopic determination, scanning electron microscope (SEM).

The aluminosilicate ion exchange herein are further characterized by their calcium ion exchange capacity, which is at least about 200 mg. equivalent of $CaCO_3$ hardness/gram of aluminosilicate, calculated on an anhydrous basis, and which generally lies within the range of from about 300 mg. eq./g. to about 352 mg. eq./g.

The ion exchange materials herein are still further characterized by their calcium ion exchange rate, which is at least about 2 grains ($Ca^{++}$)/gallon/minute/gram of aluminosilicate (anhydrous basis), and lies within the range of about 2 grains/gallon/minute/gram to about 6 grains/gallon/minute/gram, based on calcium ion hardness. Optimum aluminosilicates for builder purposes exhibit a $Ca^{++}$ exchange rate of at least about 4 grains/gallon/minute/gram.

The foregoing procedure for preparing the aluminosilicate ion exchange materials herein can be modified in its various process steps, as follows. Step (a) can be modified by using solution concentrations of $NaAlO_2$ of from 5% to 22% by weight; the optimum concentration is 16% to 16.5%. Step (b) can be modified by deletion of the NaOH. Sodium hydroxide is not required to form the aluminosilicaes herein but its use is preferred to initiate the reaction and to maintain reaction efficiency. Step (b) can be further modified by use of temperatures within the range of from about 30° C to about 100° C; 50° C is preferred. Step (c) can be modified by varying the ratio of aluminate to silicate. In order to satisfy the 1:1 $AlO_2:SiO_2$ stoichiometry requirements of a specifically preferred species in the final product, it is necessary to provide in that particular case at least a 1:1 mole ratio of $AlO_2:SiO_2$ (based on $NaAlO_2$ and $Na_2SiO_3$) in the mix. In that latter event, it is highly preferred to employ an excess of $NaAlO_2$, inasmuch as excess $NaAlO_2$ has been found to promote the rate and efficiency of the formation reaction of aluminosilicates having a 1:1 molar ratio of $AlO_2:SiO_2$. Suitable water-insoluble aluminosilicate ion exchange materials having a molar ratio of $AlO_2:SiO_2$ of less than about 1.0, i.e. from 1.0 to about 0.5, can be prepared as described hereinbefore except that the molar amount of $SiO_2$ is increased. The proper determination of the excess silicate to be used in the formation reaction can easily be optimized and does only require a routine investigation.

Step (d) can be modified to employ temperatures from 50° C to 110° C at ambient pressures; 90° C to 100° C is optimal. Of course, higher temperatures can be employed if high pressure equipment is used to prepare the aluminosilicates. When the high-temperature (90°–100° C) crystallization technique is used, step (d) will normally require a formation reaction time of about 1 to 3 hours. As noted hereinbefore, an additional possibility for preparing the ion exchange materials resides in modifying step (d) by cooling the mixture of step (c) to a temperature below about 25° C, preferably in the range from 17° C–23° C, and maintaining said mixture at that temperature for a period from about 25 hours to 500 hours, preferably from about 75 hours to about 200 hours.

Following the formation of the aluminosilicates by the foregoing procedure, the materials are recovered and dried. When employed as ion exchange builders, the aluminosilicates must be in a highly hydrated form, i.e. 10% to 28%, preferably 10% to 22%, by weight of water. Accordingly, drying of the aluminosilicates must be carried out under controlled temperature conditions. Drying temperatures of from about 90° C to about 175° C can be employed. However, at drying temperatures from about 150° C to about 175° C, the less highly hydrated materials (ca. 10% $H_2O$) are obtained. Accordingly, it is preferred to dry the aluminosilicates at 100° C to 105° C, whereby the optimum builder materials containing 18% to 22% by weight of water are secured. At these latter temperatures, the stability of the preferred 27-hydrate form of the aluminosilicate is independent of drying time.

The organic agglomerating compound of the present invention is generically described as a material having a melting point between 30° C and 100° C and a molecular weight of from about 200 to 30,000. The organic agglomerating compound is further characterized in that it is water-soluble or water-dispersible in the temperature range ordinarily employed in washing fabrics, normally about 20° C to 100° C. Thus while many organic compounds could be utilized to form the agglomerate only those compounds having the above-described properties are suitable for maintaining the agglomerate during its shelf-life and for ensuring that the aluminosilicate will be rapidly spread throughout the wash solution. Exemplary materials useful as agglomerating compounds are described below.

(1) For instance, the polyethylene glycols and polypropylene glycols ahving a molecular weight of from about 950 to about 30,000 may be obtained from the Dow Chemical Company of Midland, Michigan. Such compounds for example, having a melting point within the range of from about 30° to about 100° C may be obtained at molecular weights of 1450, 3400, 4500, 6000, 7400, 9500, and 20,000. Such compounds are formed by the polymerization of ethylene glycol or propylene glycol with the requisite number of moles of ethylene or propylene oxide to provide the desired molecular weight and melting point of the respective polyethylene glycol and polypropylene glycol.

Similarly, the organic agglomerating agent of the present invention can be a copolymer containing ethylene oxide and propylene oxide units. In this instance the starting compounds will either be ethylene glycol or propylene glycol which is polymerized with a mixture of ethylene and propylene oxide. If desired, the condensation product of ethylene oxide and propylene oxide can be modified to provide a precise mixture of the desired number of molecular units of each species in the overall molecule. This can be accomplished by using blocking agents which are later removed thus allowing one end of the molecule to contain either an ethylene oxide or a propylene oxide moiety. It is further possible to separately prepare polyethylene glycols and then to react that product with a polypropylene glycol thus forming a large copolymer having one hydrophobic (polypropylene) terminus and the other terminus a hydrophilic moiety (polyethylene).

Such compounds are readily available from commercial sources in a molecular weight range of from about 950 to 4000. Examples of compounds of this type include certain commercially available Puronic ® which are discussed in the booklet "The Wonderful World of PLURONIC Polyols ®" (1971) BASF Wyandotte Corporation (herein incorporated by reference).

The preferred organic agglomerating compounds are polyethylene glycols having a molecular weight of from about 950 to about 12,000, preferably from about 3,000 to about 9,000. A particularily useful material is polyethylene glycol having a molecular weight of about 6000. Such compounds have a melt point in the range of from about 35° C to about 90° C, preferably from about 40° to about 80° C.

The polyethylene, polypropylene and mixed glycols are conveniently referred to by means of the structural formula

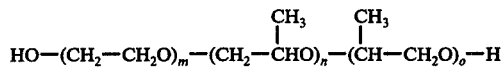

wherein $m$, $n$, and $o$ are intergers satisfying the molecular weight and temperature requirements given above.

(2) The condensation products of one mole of a saturated or unsaturated, straight or branched chain carboxylic acid having from about 10 to about 18 carbon atoms with from about 20 to about 50 moles of ethylene oxide, which liquefy between the temperatures of about 30° C and about 100° C and are solid at temperatures below about 30° C. The acid moiety can consist of mixtures of acids in the above delineated carbon atom range or it can consist of an acid having a specific number of carbon atoms within this range. The condensation product of one mole of coconut fatty acid having the approximate carbon chain length distribution of 2% $C_{10}$, 66% $C_{12}$, 23% $C_{14}$, and 9% $C_{16}$ with 35 moles of ethylene oxide is a specific example of a nonionic containing a mixture of different chain length fatty acid moieties. Other specific examples of nonionics of this type are: the condensation products of one mole of palmitic acid with 40 moles of ethylene oxide; the condensation product of one mole of myristic acid with 35 moles of ethylene oxide; the condensation product of one mole of oleic acid with 45 moles of ethylene oxide; and the condensation product of one mole of stearic acid with 30 moles of ethylene oxide.

(3) Two specific examples of nonionic surface active agents suitable for use in this invention and not specifically classified herein are polyoxyethylene glyceride esters having a hydrophilic-lipophilic balance (HLB) of 18.1 and polyoxyethylene lanolin derivatives having an HLB of 17.0. Both nonionics are manufactured by Atlas Chemical Industries, Inc.; the trade name of the former is G-1300 and the trade name of the latter is G-1795.

(4) The condensation products of one mole of alkyl phenol wherein the alkyl chain contains from about 8 to about 18 carbon atoms with from about 25 to about 50 moles of ethylene oxide. Specific examples of these nonionics are the condensation products of one mole of decyl phenol with 40 moles of ethylene oxide; the condensation products of one mole of dodecyl phenol with 35 moles of ethylene oxide; the condensation products of one mole of tetradecyl phenol with 35 moles of ethylene oxide; the condensation products of one mole of hexadecyl phenol with 30 moles of ethylene oxide.

(5) Fatty acids containing from about 12 to about 30 carbon atoms which melt between 30° C and 100° C. Specific examples of these nonionics are lauric acid, myristic acid, palmitic acid, stearic acid, tallow acid or mixtures of tallow acid and coconut acid, arachidic acid, behenic acid and ligoceric acid. Fatty acids are nonionic when utilized as a conglutinating agent. When the finished granules are utilized in alkaline solutions, however, the fatty acids are saponified to soap, an anionic surface active agent. Fatty acids having from 12 to 18 carbon atoms are preferred for use herein.

(6) Fatty alcohols containing from about 16 to about 30 carbon atoms which melt between 30° C and 100° C. Specific examples of these nonionics are 1-hexadecanol, 1-octadecanol, 1-eicosanol, 3-docosanol, 1-tetracosanol, and 1-octaosanol.

The inorganic salts may be water-soluble or water-insoluble preferably the former to promote dispersion of the aluminosilicate to rapidly control the water-hardness. Examples of such inorganic salts include those having alkali metal and alkaline earth metal cations such as magnesium, sodium, calcium or potassium, and having an anions thereof sulfates, chlorides, carbonates, bicarbonates, aluminates and phosphates, and mixtures thereof. If a water-soluble inorganic salt is utilized the cation should be sodium or potassium to avoid adding hardness ($Ca^{++}$ or $Mg^{++}$) ions to the wash solution.

Additional inorganic salts which may be utilized herein include clays such as illites, nontronites, smectites, montmorillonites, saponites, kaolinites, volchonskoites, hectorites, sauconites, attapulgites and vermiculites.

Preferred inorganic salts include sodium sulfate, sodium carbonate, magnesium sulfate, calcium carbonate, sodium orthophosphate, sodium pyrophosphate, sodium tripolyphosphate, and sodium hexametaphosphate. Especially preferred are sodium sulfate and sodium carbonate. Alkali metal silicates are not desired inorganic salts because of their ability to polymerize the aluminosilicate leading to deposits upon washed fabrics.

When the aluminosilicate, the inorganic salt and the organic agglomerating compound are to be incorporated into a detergent composition, a surface active agent (surfactant) will be included as a portion of the overall detergent composition.

The surfactant compound may be any of a wide range of anionic, nonionic, zwitterionic, ampholytic and cationic compounds. For instance, such materials include the water-soluble salts of alkyl sulfates, alkyl sulfonates, alkyl ethoxy sulfates, alkyl benzene sulfonates, olefin sulfonates, and alpha-sulfocarboxylic acids. Other surfactant materials include nonionics which are generally a condensation product of a fatty alcohol and ethylne oxide or alkylbenzene ethoxylate condensates. Builders such as alkali metal carbonates, phosphates, sulfates, and silicates may also be present with the surfactant.

Exemplary of detergent components which may be used in the present invention are those described in U.S. Pat. No. 3,852,211 to Ohren, issued Dec. 3, 1974, which is herein incorporated by reference.

COMPOSITION PREPARATION

The preparation of the particulate containing the aluminosilicate, the inorganic salt and the organic agglomerating compound is described as follows:

(a) dispersing the normally solid agglomerating compound;
(b) dispersing the inorganic salt into the agglomerating compound;
(c) admixing into the dispersed agglomerating compound the aluminosilicate of the present invention, thereby forming an intimate mixture; and,
(d) solidifying the resultant mass to form the particulate. Alternatively, the agglomerating compound can be sprayed onto a bed of the aluminosilicate and the inorganic salt. Water may be added to the mixture of the agglomerating compound, the inorganic salt, and the aluminosilicate to facilitate mixing. The excess water is then driven off by heating on forming the particulate.

A preferred method of preparing the particulate of the present invention is to spray the mixture of the aluminosilicate, the inorganic salt and the organic agglomerating compound to form granules of the size compatible with normal detergent particles. It is to be understood, however, that the product can take several forms, e.g. cakes, flakes, prills, or granules which are reduced by conventional methods to the appropriate size.

The preferred method of preparing the particulate of the present invention is by spray-drying or spray cooling the mass to form the particulate. It is essential when spray-drying is employed that the aluminosilicate should not be dehydrated beyond the point where its ion exchange capacity is adversely affected. It is further important in a spray-drying operation that the organic agglomerating compound should not be heated to the extent at which it begins to decompose. A small amount of anionic surfactant on the order of 0.5-4% by weight of the particulate may be used to aid in density control of the particulate.

When a spray-drying operation is used to prepare the agglomerate the apparatus for conducting the drying operating may be a multilevel spray-drying tower such as that described in U.S. Pat. Nos. 3,629,950 and 3,629,955 issued to Davis et al, both of which are herein incorporated by reference.

In preparing the particulate of the present invention the organic agglomerating compound will be present at from about 0.3 part to about 3 parts, preferably from about 0.5 part to about 1.2 parts by weight while the alumino-silicate will be present at from about 5 parts to about 50 parts, preferably from about 10 parts to about 30 parts by weight.

The inorganic salts which promote lessened friability are used at a level of from about 0.5 part to about 3 parts, preferably from about 0.7 part to about 2.5 parts and most preferably from about 0.8 part to about 2 parts by weight in the particulate. Larger amounts of the inorganic salts may be utilized in the particulate, however, the benefit reaches a maximum at about 3 parts and additional amounts merely take up more formula room.

COMPOSITION UTILIZATION

When the particulate of the present invention is utilized as a water softener for laundering purposes, it is simply added to the wash tub or washing machine, preferably before the fabrics and the detergent composition are introduced and after the water has been introduced into the container.

When the particulate of the present invention is used as a complete detergent product with a surfactant, the overall product is desirably added to the wash tub or the washing machine before the fabrics and after the water has been added.

The amount of the particulate utilized as a water softening pretreatment is simply an amount sufficient to remove most of the calcium and magnesium ions present in the wash water. As the product of the present invention normally has a density of from about 0.2 gram per cc to about 1 gram per cc; sufficient usage of the product will under most United States conditions be satisfied by the use of from about 0.25 cup to about 1 cup. Under continental European washing conditions where the water hardness is somewhat greater, the product will normally be used at a level of from about 0.5 cup to about 3 cups.

Laundry detergent products of the present invention as used under U.S. washing conditions at from about 0.5 to about 1.5 cups and from about 1 cup to about 3 cups under European washing conditions.

The following are Examples of the present invention:

EXAMPLE II

A particulate containing an aluminosilicate of the formula

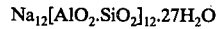

$$Na_{12}[AlO_2.SiO_2]_{12}.27H_2O$$

sodium sulfate and polyethylene glycol (MW 6000) is prepared by dissolving the latter compound present at 1 part with 25 parts of the aluminosilicate and 1 part of the sodium sulfate. Sufficient water is present (Ca. 40%) to fluidize the mixture.

The mixture is then spray dried into granules which reach a temperature of about 40° C – 120° C to give a free flowing particulate composition which is not dusty.

The particulate composition is tested for friability by mechanical attrition accomplished by gas flow under conditions approximating transportation and handling of the particulate. The samples of the particulate are prepared by riffling and testing one portion thereof for the fines level through a series of 20, 28, and 100 mesh screens to give a base reading. A second portion is attrited and the weight through 100 mesh is recorded. The base percent is subtracted from the percent through 100 mesh following attrition. This reading reflects the friability of the particulate from transportation and handling. Values of 35% (friability) or greater through 100 mesh over base indicate undesirable break-up of the particulate.

The particulate described above containing 1 part sodium sulfate has a friability percent of 12.3%. A 0.5 part sodium sulfate sample had 25.2% friability while a 1.5 part sample had 13.1%. A sample prepared according to Example II containing no sodium sulfate had an unacceptable friability percent of 43.2%. Thus the compositions prepared according to the invention demonstrated a remarkable ability to withstand crumbling.

Example II is repeated using sodium carbonate with substantially similar results. Example II is again repeated utilizing the inorganic salts, each in turn, listed at page 36, line 17 through page 37, line 9, with the desired results. Similar results are obtained when the inorganic salt used at 1 part in Example II is an equal weight mixture of sodium sulfate and sodium carbonate.

Surprisingly the very small quantities of the inorganic salts drastically reduce the friability of the particulate.

EXAMPLE III

The particulate prepared in Example II is combined with a spray-dried granular detergent product of the following composition:

| | |
|---|---|
| 9% | Neodol 23-3T ($C_{12-13}$ alcohol mixture ethoxylated to an average of 3 ethylene oxide units per mole of alcohol) |
| 10% | $Na_2CO_3$ |
| 18% | Sodium silicate ($SiO_2:Na_2O$ 2.0) |
| 36% | Sodium sulfate, free moisture, and miscellaneous |
| 27% | Particulate as described above |

All of the components other than the particulate are spray-dried by conventional means. The particulate and the detergent granules are compatible in dimension.

A similar product is prepared for comparison purposes except that the aluminosilicate is in intimate contact with all of the remaining components. In this case the polyethylene glycol is admixed with the combined product.

Both products were then tested for their ability to clean clay-soiled polyester fabric swatches in 35° C $H_2O$ containing $Ca^{++}$ and $Mg^{++}$ hardness in a 3:1 ratio at 2 grains per gallon.

The product containing the aluminosilicate prepared in accordance with the present invention (A) cleaned the fabric swatches significantly better than the comparative product (B). The results in Hunter Whiteness Units with a Least Significant Difference at 95% (LSD 0.95) of 2.4 were:

| (A) | (B) |
|---|---|
| 48.7 | 41.3 |

Product (A) is more soluble then product (B) thus promoting rapid control of the $Ca^{++}$ and $Mg^{++}$ ions in the wash water. The product prepared by the present invention is found to be acceptable with respect to fabric deposition.

The presence of the sodium sulfate makes the particulate more resistant to crumbling (less friable) than a similar composition without the inorganic salt. As a result the particulate containing the inorganic salt upon prolonged handling and transportation remains compatible in size with the detergent granules.

What is claimed is:

1. A laundering composition comprising two discrete particles the first of which is an intimate mixture consisting essentially of:
    (a) from about 10 parts to about 30 parts of an aluminosilicate selected from the group consisting of:
        (i) an amorphous compound of the formula $Na_x(xAlO_2.ySiO_2)$ wherein $x$ has a value of from 1 to 1.2 and $y$ is 1, said amorphous material being further characterized by an $Mg^{++}$ exchange capacity of at least about 50 mg.eq. $CaCO_3$/g;
        (ii) a cubic crystalline compound of the formula $Na_z[(AlO_2)_z(SiO_2)_j]kH_2O$ wherein $z$ and $j$ are integers of at least 6; the molar ratio of $z$ to $j$ is in the range of from 1.0 to about 0.5 and $k$ is an integer from about 15 to 264; said cubic crystalline aluminosilicate ion exchange material having a particle size diameter from about 0.1 micron to about 100 microns; a calcium ion exchange capacity of at least about 200 mg. eq./g; and a calcium ion exchange rate of at least about 2 grains/gallon/minute gram and mixtures thereof;
    (b) from about 0.7 parts to about 1.2 parts of an organic agglomerating compound having a melting point of from about 30° C to 100° C selected from the group consisting of polyethylene glycol, polypropylene glycol, the condensation product of carboxylic acid and ethylene oxide, polyoxyethylene glyceride ester, polyoxyethylene lanolin derivative, the condensation product of alkyl phenol and ethylene oxide, fatty acid, fatty alcohol and mixtures thereof; and
    (c) from about 0.8 part to about 2 parts of an inorganic salt selected from the group consisting of sodium sulfate and sodium carbonate; and as a second discrete granule:
    (d) a spray-dried detergent granule containing a surfactant;
    in a weight ratio of $(a)+(b)+(c)$ to $(d)$ of from about 5:1 to 1:20.

2. The composition of claim 1 wherein in aluminosilicate is an amorphous compound of the formula $Na_x(xAlO_2.ySiO_2)$ wherein $x$ has a value of from 1 to 1.2 and $y$ is 1, said amorphous material being further characterized by an $Mg^{++}$ exchange capacity of at least about 50 mg. eq. $CaCO_3$/g.

3. The composition of claim 1 wherein the second discrete granule (d) also contains a detergency builder.

4. The composition of claim 1 wherein the organic agglomerating compound has the structural formula

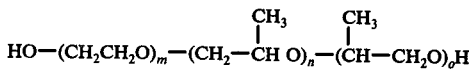

wherein *m*, *n* and *o* are integers, such that the compound has a molecular weight of from about 950 to about 30,000.

5. The composition of claim 1 wherein the second discrete granule (d) also contains an alkali metal silicate.

6. The composition of claim 5 wherein the alkali metal silicate is sodium silicate.

7. The composition of claim 6 wherein the sodium silicate has an $SiO_2:Na_2O$ ratio of 2.0.

8. The composition of claim 1 wherein the surfactant is selected from the group consisting of ethoxylated alcohols and the water-soluble salts of alkylbenzene sulfonates, alkyl ether sulfates, alkyl sulfates, and mixtures thereof.

9. The composition of claim 8 wherein the detergency builder is selected from the group consisting of alkali metal silicates, alkali metal sulfates, and alkali metal phosphates.

10. The composition of claim 9 wherein the detergency builder is an alkali metal pyrophosphate.

11. The composition of claim 9 wherein the inorganic salt is sodium sulfate.

12. The composition of claim 1 wherein the aluminosilicate is a compound of the formula $Na_z[(AlO_2)_z.(SiO_2)_j].kH_2O$ wherein $z$ and $j$ are integers of at least 6; the molar ratio of $z$ to $j$ is in the range of from 1.0 to about 0.5 and $k$ is an integer from about 15 to 264; said aluminosilicate ion exchange material having a particle size diameter from about 0.1 micron to about 100 microns; a calcium ion exchange capacity of at least about 200 mq./g; and a calcium ion exchange rate of at least about 2 grains/gallon/minute gram and mixtures thereof.

13. The composition of claim 12 wherein the organic agglomerating compound is a polyethylene glycol.

14. The composition of claim 13 wherein the aluminosilicate is $Na_{12}[AlO_2.SiO_2]_{12}.kH_2O$ wherein $k$ is an integer of from about 20 to about 30.

15. The composition of claim 14 wherein the polyethylene glycol has a molecular weight in the range of from about 3000 to about 9000.

16. The composition of claim 15 wherein the polyethylene glycol has a melting point of from about 40° C to about 80° C.

17. The composition of claim 16 wherein the polyethylene glycol has a molecular weight of about 6000.

18. The composition of claim 17 wherein the inorganic salt is sodium sulfate.

* * * * *